US008382058B2

(12) United States Patent
Sovis

(10) Patent No.: US 8,382,058 B2
(45) Date of Patent: Feb. 26, 2013

(54) VEHICLE SEAT TRACK ASSEMBLY HAVING A SINGLE TOOTHED BELT DRIVE MECHANISM

(75) Inventor: David Michael Sovis, Grawn, MI (US)

(73) Assignee: Creative Seating Technologies, LLC, Northville, MI (US)

( * ) Notice: Subject to any disclaimer, the term of this patent is extended or adjusted under 35 U.S.C. 154(b) by 104 days.

(21) Appl. No.: 13/104,148

(22) Filed: May 10, 2011

(65) Prior Publication Data

US 2011/0278419 A1 Nov. 17, 2011

Related U.S. Application Data

(60) Provisional application No. 61/333,324, filed on May 11, 2010.

(51) Int. Cl.
 *F16M 13/00* (2006.01)
(52) U.S. Cl. .......................................... 248/424; 248/429
(58) Field of Classification Search .................. 248/424, 248/429, 430; 297/341; 74/89.23; 474/148; 296/65.01
 See application file for complete search history.

(56) References Cited

U.S. PATENT DOCUMENTS

| | | | |
|---|---|---|---|
| 3,873,152 A | 3/1975 | Garas | 297/68 |
| 5,445,354 A | 8/1995 | Gauger et al. | 248/429 |
| 5,762,309 A * | 6/1998 | Zhou et al. | 248/429 |
| 5,791,622 A * | 8/1998 | Gauger | 248/430 |
| 5,797,576 A * | 8/1998 | Gauger | 248/429 |
| 5,816,555 A | 10/1998 | Ito et al. | 248/429 |
| 6,499,712 B1 * | 12/2002 | Clark et al. | 248/429 |
| 6,866,603 B2 | 3/2005 | Ackerman et al. | 474/148 |
| 7,021,595 B2 | 4/2006 | Furukawa | 248/429 |
| 7,472,879 B2 | 1/2009 | Weber et al. | 248/429 |
| 7,810,780 B2 * | 10/2010 | Koga et al. | 248/430 |
| 8,128,051 B2 * | 3/2012 | Koga et al. | 248/429 |
| 2008/0023613 A1 * | 1/2008 | Brewer et al. | 248/429 |
| 2009/0272869 A1 * | 11/2009 | Beneker et al. | 248/429 |
| 2010/0213341 A1 * | 8/2010 | Beneker et al. | 248/419 |
| 2010/0264288 A1 * | 10/2010 | Thuleau et al. | 248/429 |
| 2010/0320352 A1 * | 12/2010 | Weber | 248/429 |

OTHER PUBLICATIONS

International Search Report and Written Opinion for corresponding International Application No. PCT/US2011/035864 mailed Aug. 4, 2011, 3 pgs.
International Written Opinion with search for corresponding International Application No. PCT/U52011/035864 mailed Aug. 4, 2011, 13 pgs.

* cited by examiner

*Primary Examiner* — Ramon Ramirez

(57) ABSTRACT

A drive mechanism for a vehicle seat track assembly includes a housing and a motor having an output shaft. An output speed reducing mechanism is coupled to the output shaft. The motor and the output speed reducing mechanism are mounted to the housing. A toothed drive pulley is rotatably mounted to the housing and coupled to the output speed reducing mechanism. A first toothed pulley is rotatably mounted at a first end of the housing. A second toothed pulley is rotatably mounted at a second end of the housing. A continuous toothed belt is rotated by the toothed drive pulley and causes rotation of the first and second toothed pulleys.

23 Claims, 14 Drawing Sheets

VEHICLE SEAT TRACK ASSEMBLY HAVING A SINGLE TOOTHED BELT DRIVE MECHANISM

CROSS-REFERENCE TO RELATED APPLICATIONS

This application claims the benefit of U.S. Provisional Application No. 61/333,324, filed on May 11, 2010. The disclosure of the above application is incorporated herein by reference in its entirety.

FIELD

The present disclosure relates to vehicle seats, and more particularly to a seat track assembly with a belt driven actuator for providing fore and aft seat adjustment.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIGS. 1 and 2, seats in a vehicle are typically attached by a seat track assembly 10 to a floor of the vehicle. The seat track assembly 10 provides for fore-aft adjustment and typically includes a first track portion 12 arranged in parallel with a second track portion 14. The first and second track portions 12 and 14 each include upper and lower tracks 15 and 16, respectively. The lower tracks 16 are connected to the vehicle. The upper tracks 15 move fore and aft relative to the stationary lower tracks 16. A third track portion 17 is connected generally perpendicular to the upper tracks 15 of the first and second track portions 12 and 14, respectively.

The third track portion 17 includes a motor 18 connected by drive cables 20 and 22 (shown housed in tubes 23) to first and second gearboxes 24 and 26 arranged in the first and second track portions 12 and 14, respectively. First and second lead screws 28 and 30 pass through first and second brackets 32 and 34 and the first and second gearboxes 24 and 26, respectively. End brackets 36 and 38 connect ends of the first and second lead screws 28 and 30 to the vehicle.

The first and second gearboxes 24 and 26 include worms and worm gears. The worms may have a lead angle of around 15°. Gear reduction occurs in the first and second gearboxes 24 and 26 at each of the first and second track portions 12 and 14, respectively, which tends to increase sound and vibration resonance. Multiple gear reductions may create a lead-lag situation in the power system and increase droning and noise variation.

The drive cables 20 and 22 may be rotated at relatively high speeds, such as 1500-3000 rpm, which tends to induce gear mesh noise or cable whip. The drive cables 20 and 22 are also sensitive to misalignment between the first and second track portions 12 and 14. Noise reduction measures for the drive cables 20 and 22 such as the tubes 23 and flocking increase friction and power loss. Also, torque translation from the motor 18 to the first and second gearboxes 24 and 26 at higher rotational speeds before gear reduction at the first and second gearboxes 24 and 26 erodes power translation.

The seat track assembly 10 must be a rigid structure to negate misalignment and sound/vibration resonance. Also, lubrication within the seat track assembly 10 can result in contamination due to the location of the seat adjuster within the vehicle. Different dampening measures must be used to reduce noise and vibration.

SUMMARY

A vehicle seat track assembly includes a first track portion including a first track, a second track, a bracket connected to the first track and including first and second portions, a toothed drive nut including a threaded bore, and a lead screw passing through the first portion of the bracket, the toothed drive nut and the second portion of the bracket. A second track portion is arranged parallel to the first track portion and includes a first track, a second track, a bracket connected to the first track and including first and second portions, a toothed drive nut including a threaded bore, and a lead screw passing through the first portion of the bracket, the toothed drive nut and the second portion of the bracket. A third track portion includes a motor having an output shaft, an output speed reducing mechanism coupled to the output shaft, a toothed drive pulley coupled to the output speed reducing mechanism, and a continuous toothed belt that is rotated by the toothed drive pulley and that causes rotation of the toothed drive nut of the first track portion and the toothed drive nut of the second track portion.

In other features, the output speed reducing mechanism comprises one of a gearbox and a worm gear. The third track portion further includes a housing and a first toothed pulley and a second toothed pulley rotatably attached to the housing at a first end and a second end of the housing. The continuous toothed belt rotates around the first toothed pulley and the second toothed pulley. The first toothed pulley causes rotation of the toothed drive nut of the first track portion and the second toothed pulley causes rotation of the toothed drive nut of the second track portion.

In other features, the continuous toothed belt is in contact with and sandwiched between the first toothed pulley and the toothed drive nut at the first end. The continuous toothed belt is in contact with and sandwiched between the second toothed pulley and the toothed drive nut at the second end. The output speed reducing mechanism reduces an output speed of the output shaft by a ratio of 1:2 and 1:10. The output speed reducing mechanism reduces an output speed of the output shaft by a ratio of 1:4 to 1:8. The output speed reducing mechanism reduces an output speed of the output shaft by a ratio of approximately 1:6.

In other features, the bracket is "U"-shaped. The third track portion further comprises first and second idler pulleys that bias the continuous toothed belt against the drive pulley. The lead screw of the first track portion and the lead screw of the second track portion have a pitch that is less than 3 mm per revolution of the toothed drive nut of the first track portion and the toothed drive nut of the second track portion, respectively. The lead screw of the first track portion and the lead screw of the second track portion have a pitch that is between 1 and 2.5 mm per revolution of the toothed drive nut of the first track portion and the toothed drive nut of the second track portion, respectively.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
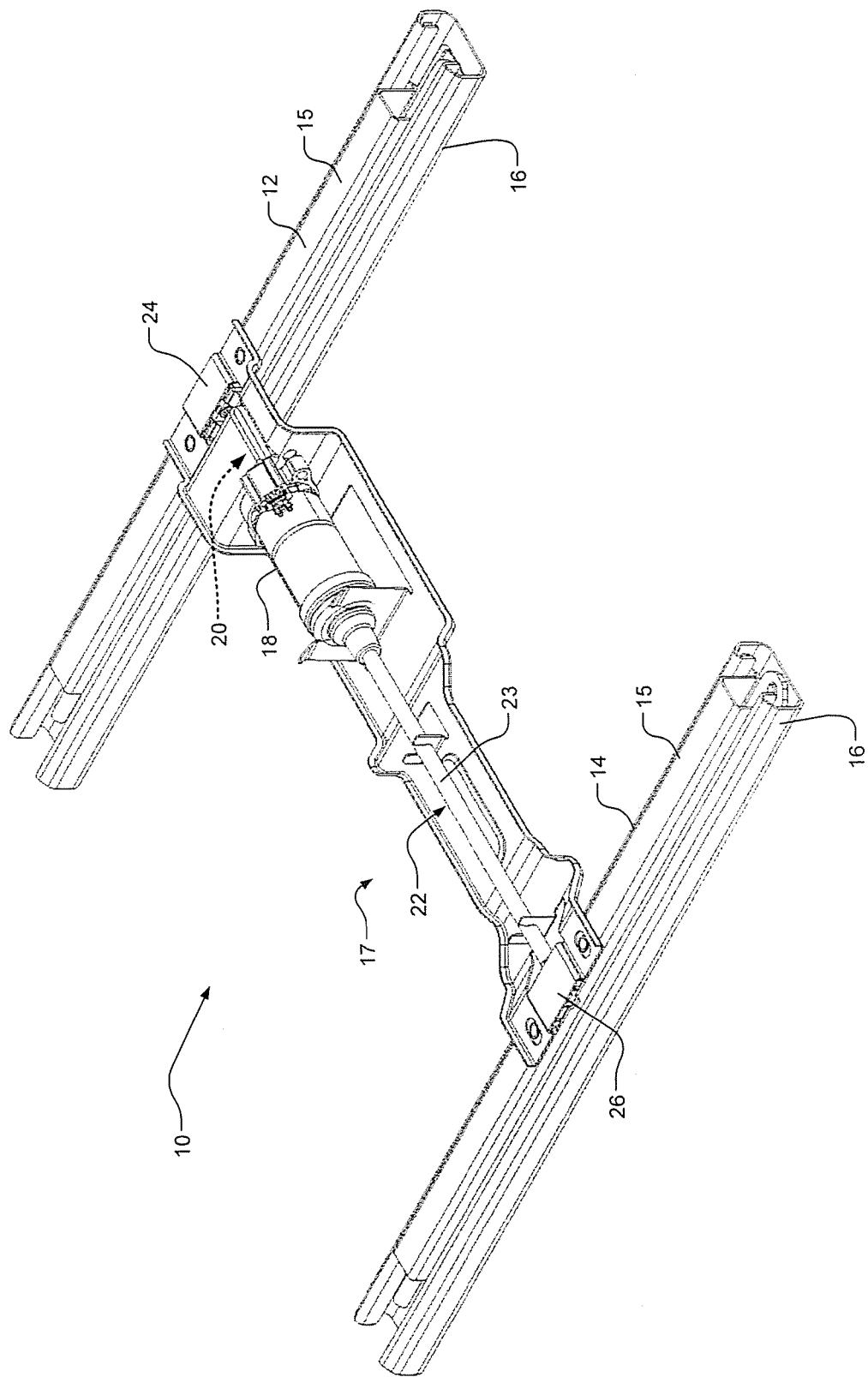
FIG. 1 is a perspective view of an example vehicle seat track assembly according to the prior art.
Figure 2:
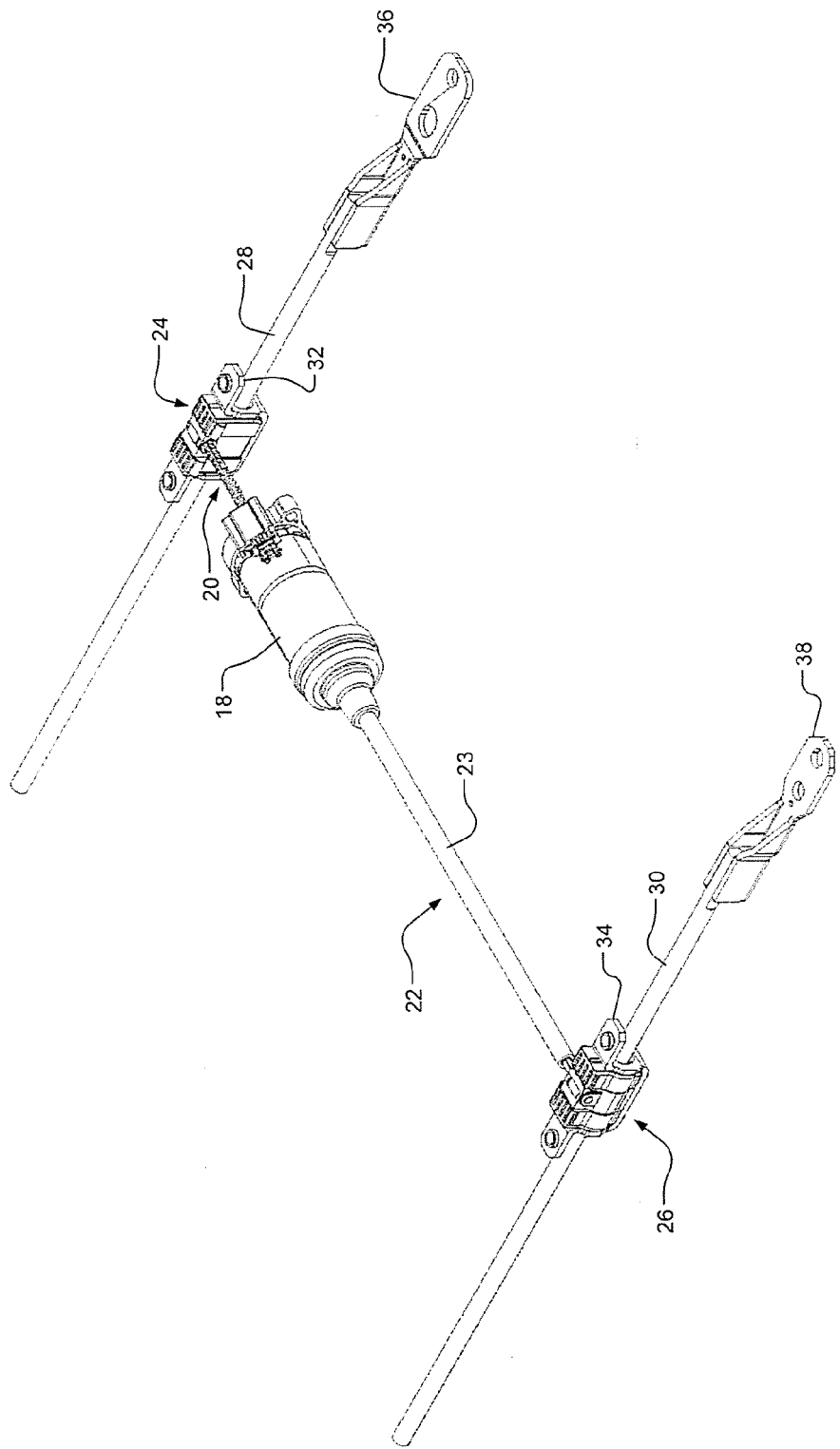
FIG. 2 is a perspective view of the seat track assembly of FIG. 1 with components removed to show a drive mechanism.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure. As used herein, approximately shall refer to a value +/−10%.

Figure 3:
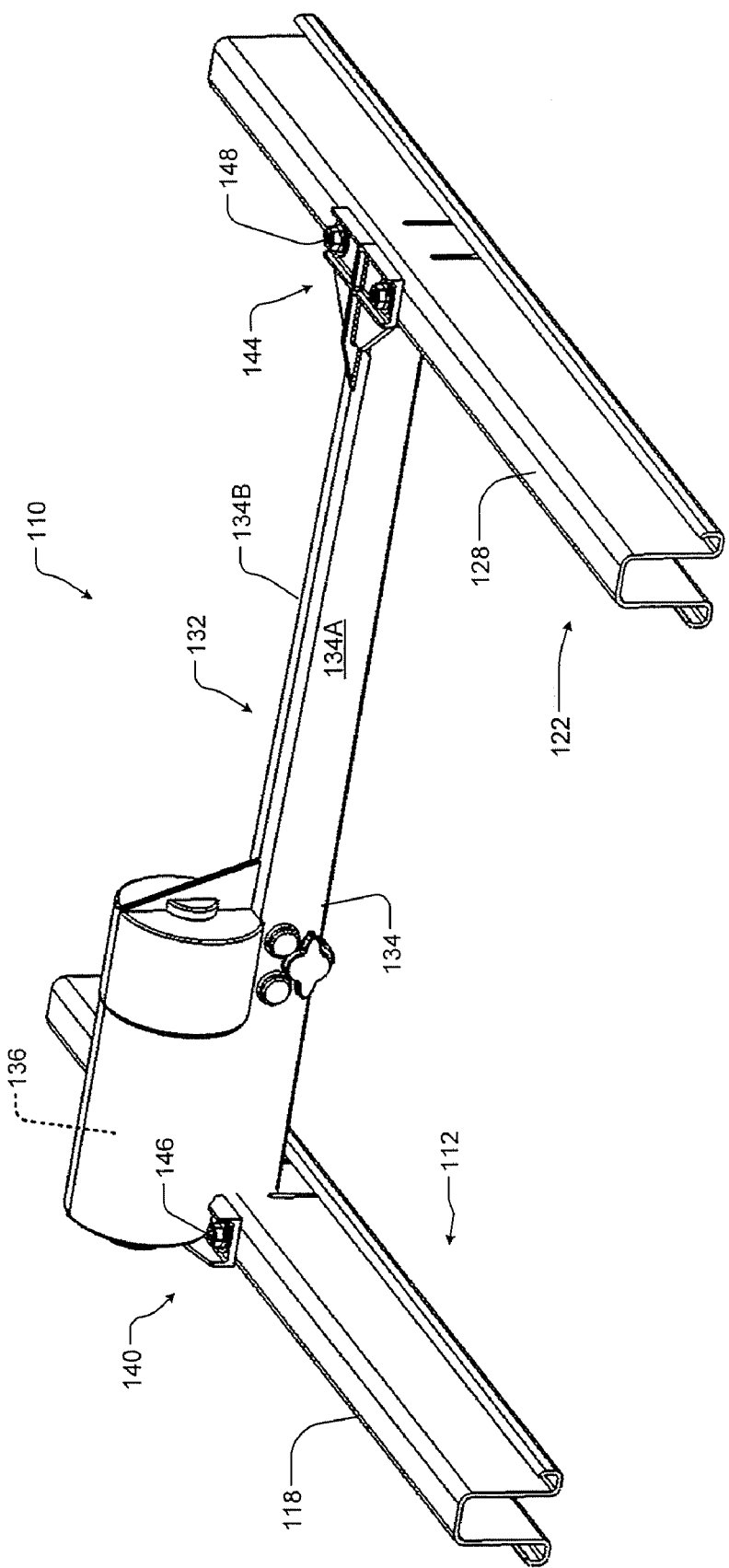
FIG. 3 is a perspective view of an example of a vehicle seat track assembly according to the present disclosure.

The present disclosure provides an improved vehicle seat track assembly having a belt drive mechanism. Referring now to FIGS. 3-8, an example of a vehicle seat track assembly 110 according to the present disclosure is shown. In FIG. 3, the vehicle seat track assembly 110 includes a first track portion 112 including a first lower track (similar to 16 in FIG. 1) and a first upper track 118 that are arranged adjacent to one side of a seat (not shown). The first upper track 118 is adapted to move fore and aft relative to the first lower track.

A second track portion 122 includes a second lower track (similar to 16 in FIG. 1) and a second upper track 128 that are arranged adjacent to a second side of the seat. The second upper track 128 is adapted to move fore and aft relative to the second lower track. The first and second lower tracks are typically connected to a floor pan of a vehicle. The first track portion 112 is arranged generally parallel to the second track portion 122.

A third track portion 132 is connected between the first and second upper tracks 118 and 128. The third track portion 132 includes a housing 134 (including first and second housing portions 134A and 134B) and a motor 136. As will be described further below, the motor 136 rotates to cause the first and second upper tracks 118, 128 to move fore and aft relative to the first and second lower tracks.

The third track portion 132 includes a first end 140 that is attached to the first upper track 118. For example only, the first end 140 can be attached to the first upper track 118 using one or more fasteners 146 such as bolts. The third track portion 132 includes a second end 144 that is attached to the second upper track 128. For example only, the second end 144 can be attached to the second upper track 128 using one or more fasteners 148 such as bolts.

In FIGS. 4-7, the third track portion 132 and the motor 136 are shown with the housing portion 134A removed. The third track portion 132 includes a continuous toothed belt 170. The toothed belt 170 may have teeth on inner and outer surfaces thereof. An output shaft of the motor 136 drives a worm gear 176. The worm gear 176 engages an outer surface 177 of the toothed belt 170. While the worm gear is shown, any output speed reducing mechanism can be used to reduce an output speed of the output shaft of the motor 136.

First and second idler pulleys 180, 182 bias the outer surface of one portion of the toothed belt 170 against the worm gear 176. Another portion of the toothed belt 170 may be threaded between the first and second idler pulleys 180, 182 and a third idler pulley 184. A pinch spring 185 may be used to bias the third idler pulley 184 against the toothed belt 170 and the first and second idler pulleys 180, 182.

At the first end 140, the toothed belt 170 rotates around a drive pulley 186. A drive nut 188 includes a toothed outer portion 190 and a threaded bore 194 (FIG. 5) passing through the drive nut 188. The drive nut 188 is located adjacent to the drive pulley 186 and rotates around a first lead screw 206, which is threaded. The first lead screw 206 passes through one side of a bracket 210, the threaded bore 194 of the drive nut 188 and another side of the bracket 210. In some examples, the bracket 210 has a "U"-shaped cross section, although other arrangements may be used. The bracket 210 may be used to attach the third track portion 132 to the first upper track 118 at the first end 140.

Opposite sides of the toothed belt 170 are in contact with the drive pulley 186 and the drive nut 188, respectively. When the drive nut 188 is rotated by the toothed belt 170, the threads of the threaded bore 194 of the drive nut 188 rotate along the first lead screw 206. The drive nut 188 moves relative to the first lead screw 206, which causes the first end 140 of the third track portion 132 and the first upper track 118 to move relative to the first lead screw 206.

At the second end 144, the toothed belt 170 rotates around a drive pulley 224. A drive nut 228 includes a toothed outer portion and a threaded bore passing through the drive nut 228. The drive nut 228 is located adjacent to the drive pulley 224 and rotates around a second lead screw 236, which is threaded. The second lead screw 236 passes through one side of a bracket 240, the threaded bore of the drive nut 228 and another side of the bracket 240. The bracket 240 may be used to attach the third track portion 132 to the second upper track 128 at the second end 144.

Opposite sides of the toothed belt 170 are in contact with the drive pulley 224 and the drive nut 228, respectively. When the drive nut 228 is rotated by the toothed belt 170, the threads of the threaded bore of the drive nut 228 rotate along the second lead screw 236. The drive nut 228 moves relative to the second lead screw 236, which causes the second end 144 of the third track portion 132 and the second upper track 128 to move relative to the second lead screw 236.

Figure 4:
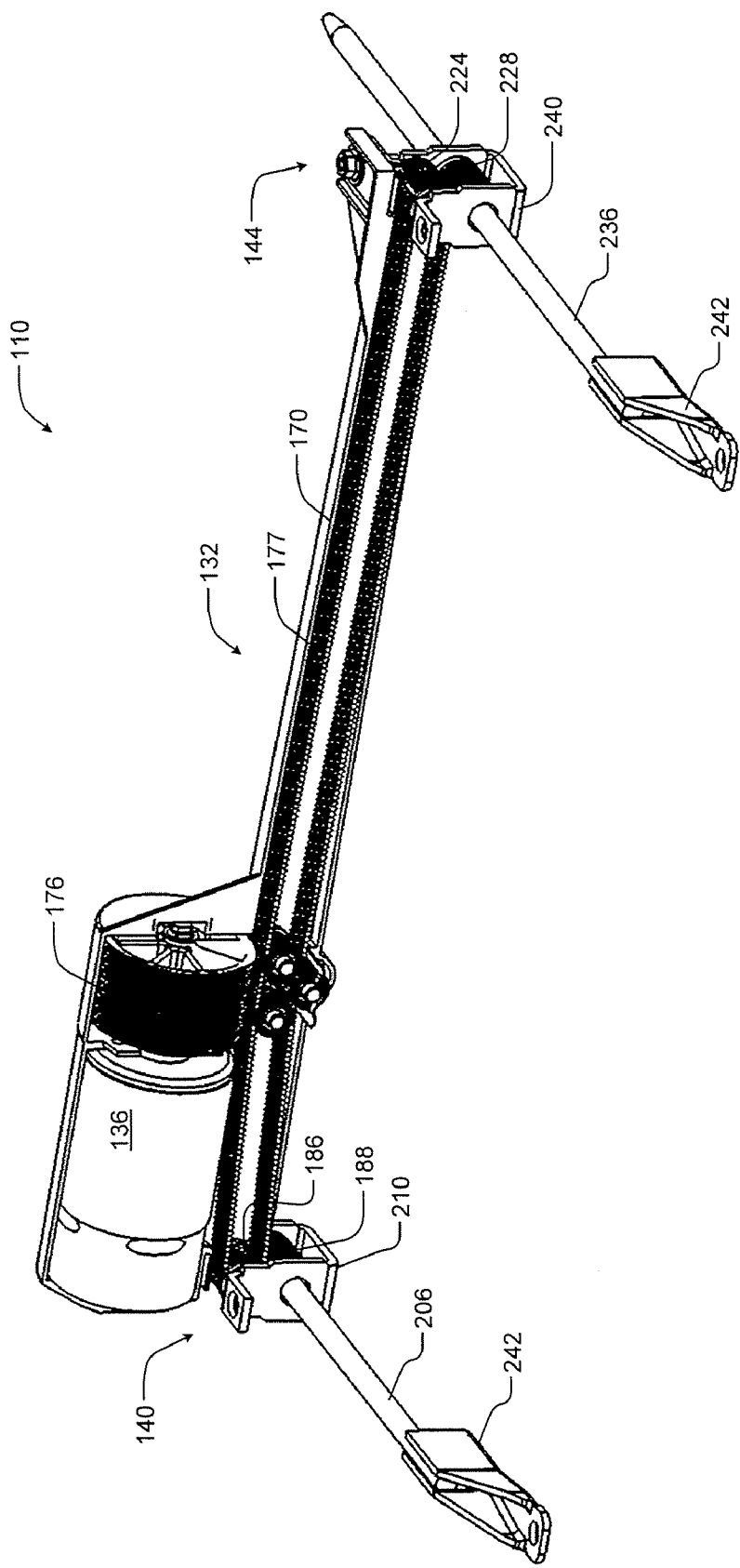
FIG. 4 is a perspective view of the vehicle seat track assembly of FIG. 3 with components removed to show a drive mechanism.
Figure 5:
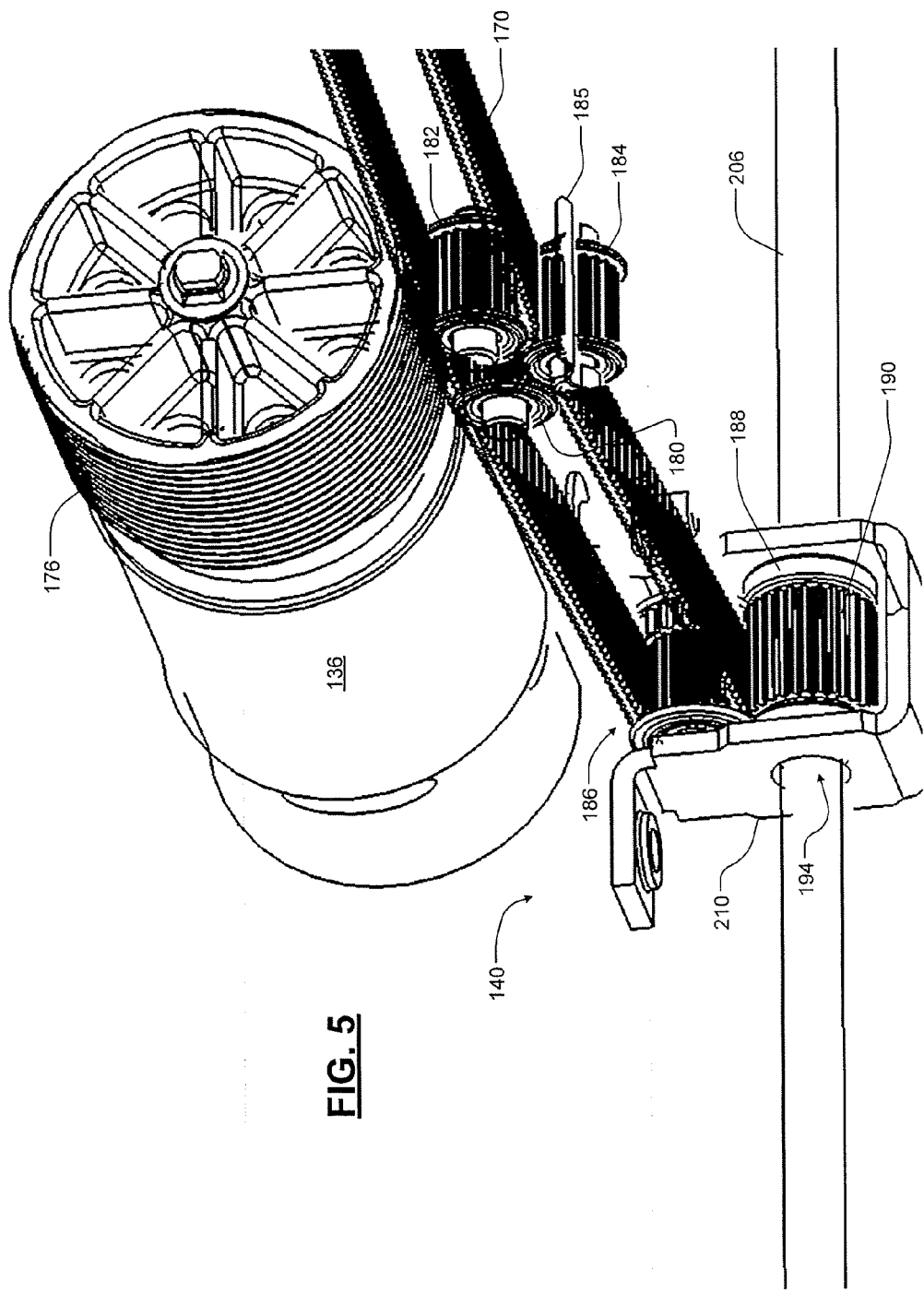
FIG. 5 is an enlarged perspective view of the drive mechanism of the vehicle seat track assembly of FIG. 3.
Figure 6:
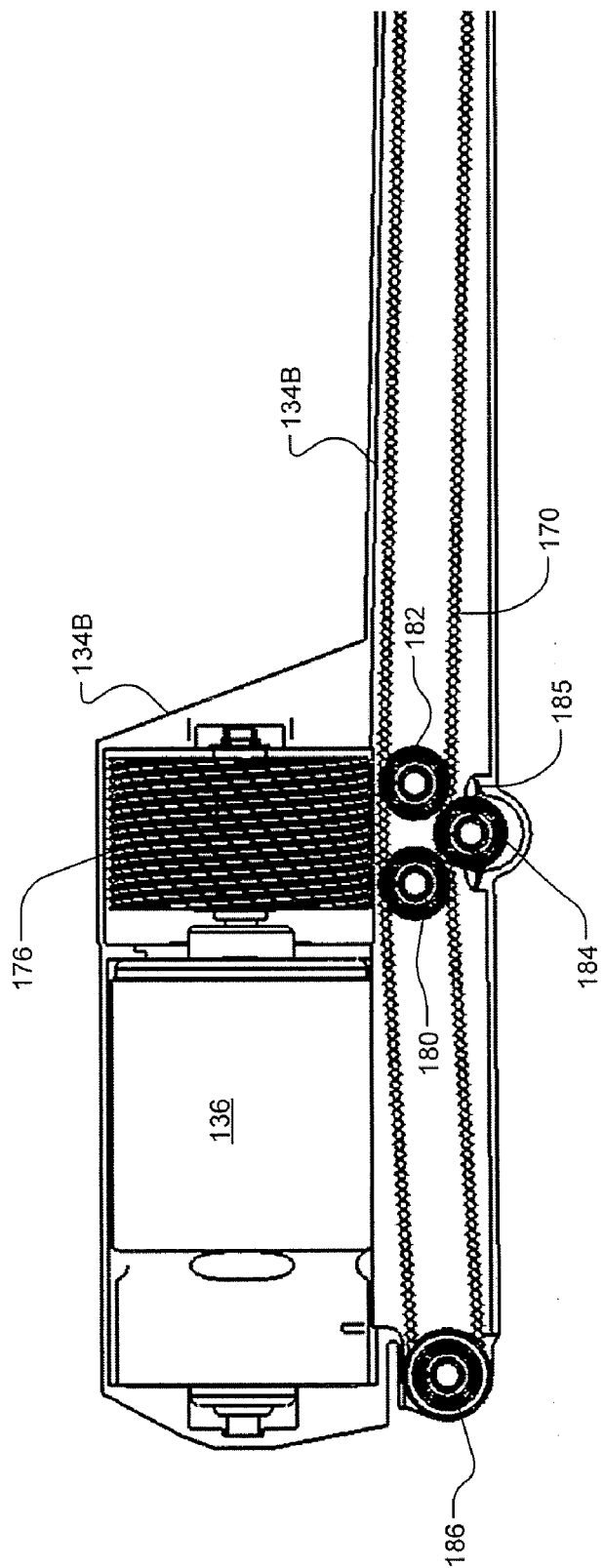
FIG. 6 is a side view of the drive mechanism of the vehicle seat track assembly of FIG. 3.
Figure 7:
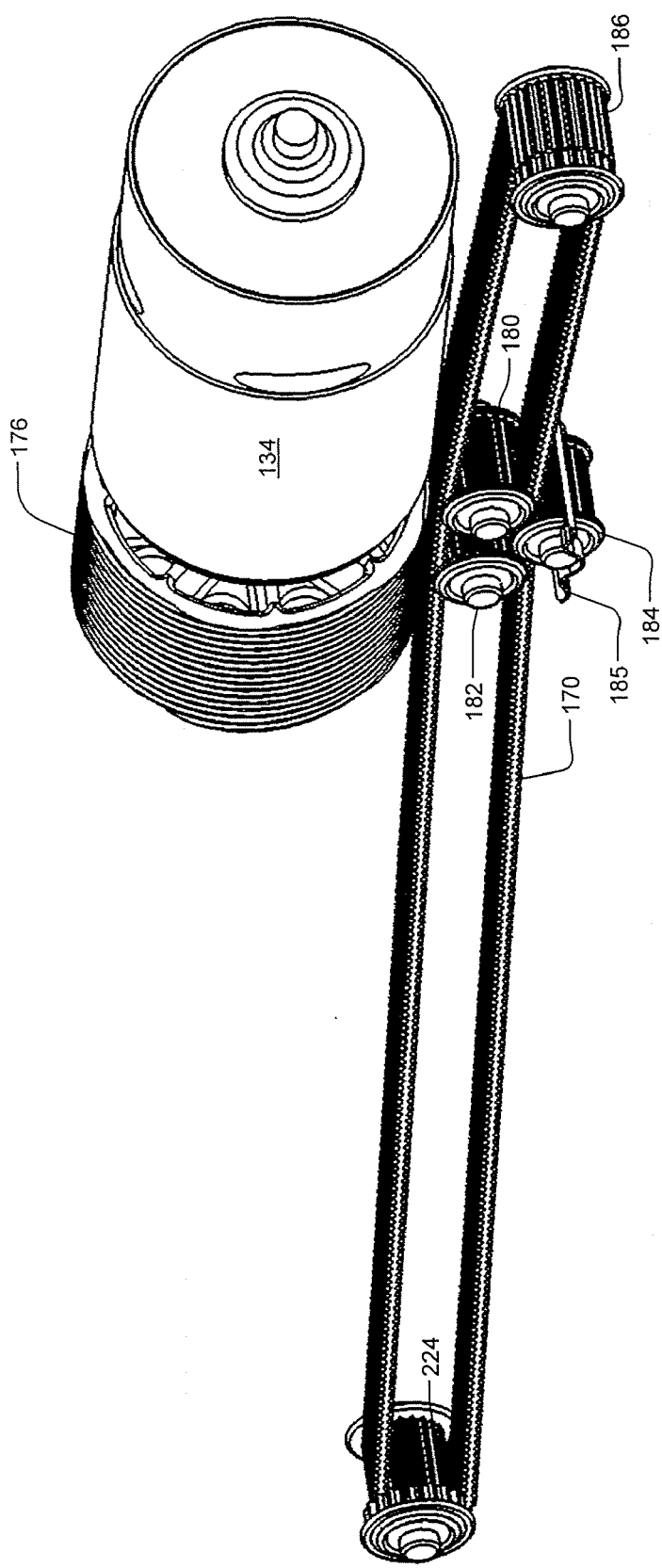
FIG. 7 is another perspective view of the drive mechanism of the vehicle seat track assembly of FIG. 3.
Figure 8:
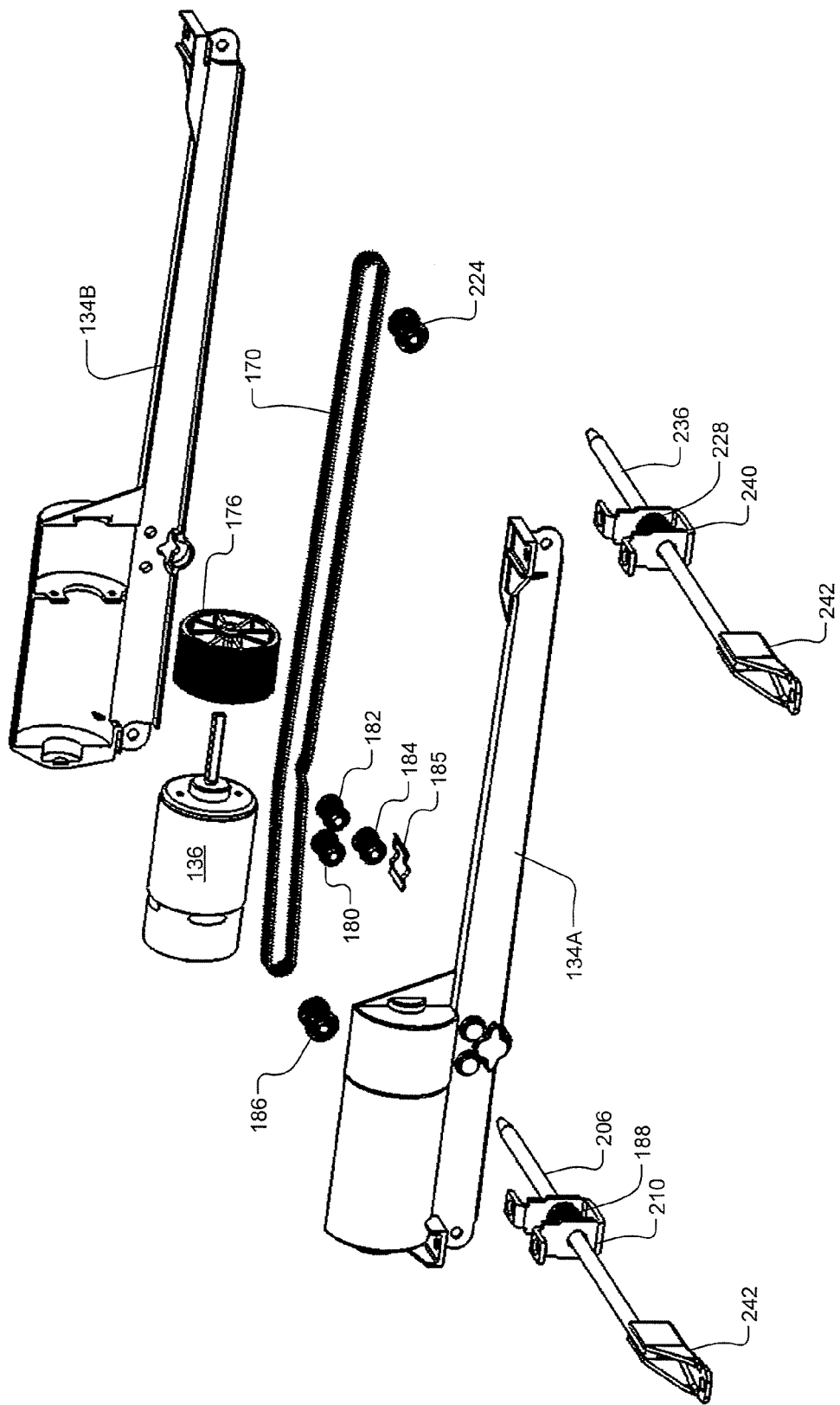
FIG. 8 is an exploded perspective view of the vehicle seat track assembly of FIG. 3.

In FIGS. 4 and 8, the first and second lead screws 206 and 236 may include brackets 242 located at ends thereof. The brackets 242 may be used to fix a position of the first and second lead screws 206 and 236 relative to the floor of the vehicle. The brackets 242 also provide clearance to allow the drive nuts 188 and 228 to move relative to the first and second lead screws 206 and 236 without touching the first and second lower tracks.

Alternately, the toothed belt 170 may have teeth on one side only such as on the inner or outer surface thereof. For example only, the toothed belt may have teeth on the outer side only. One or more idler pulleys can be arranged outside of the toothed belt to bias the toothed belt against a drive pulley. At the first and second ends, the toothed belt may rotate around tensioner pulleys. The tensioner pulleys bias the teeth against the drive nuts. Still other variations may include the use of splined surfaces.

Figure 9:
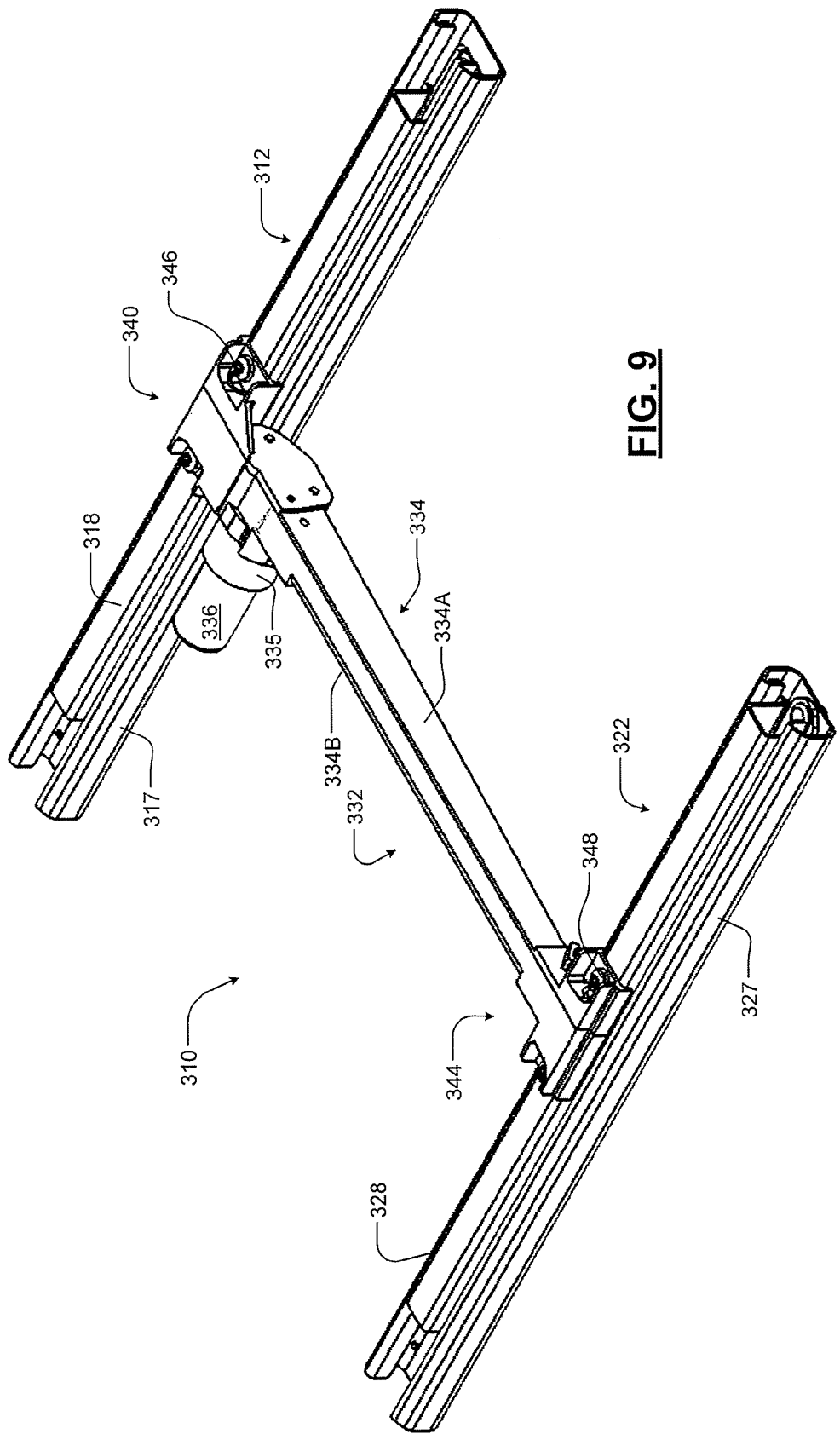
FIG. 9 is a perspective view of another example of a vehicle seat track assembly according to the present disclosure.
Figure 10:
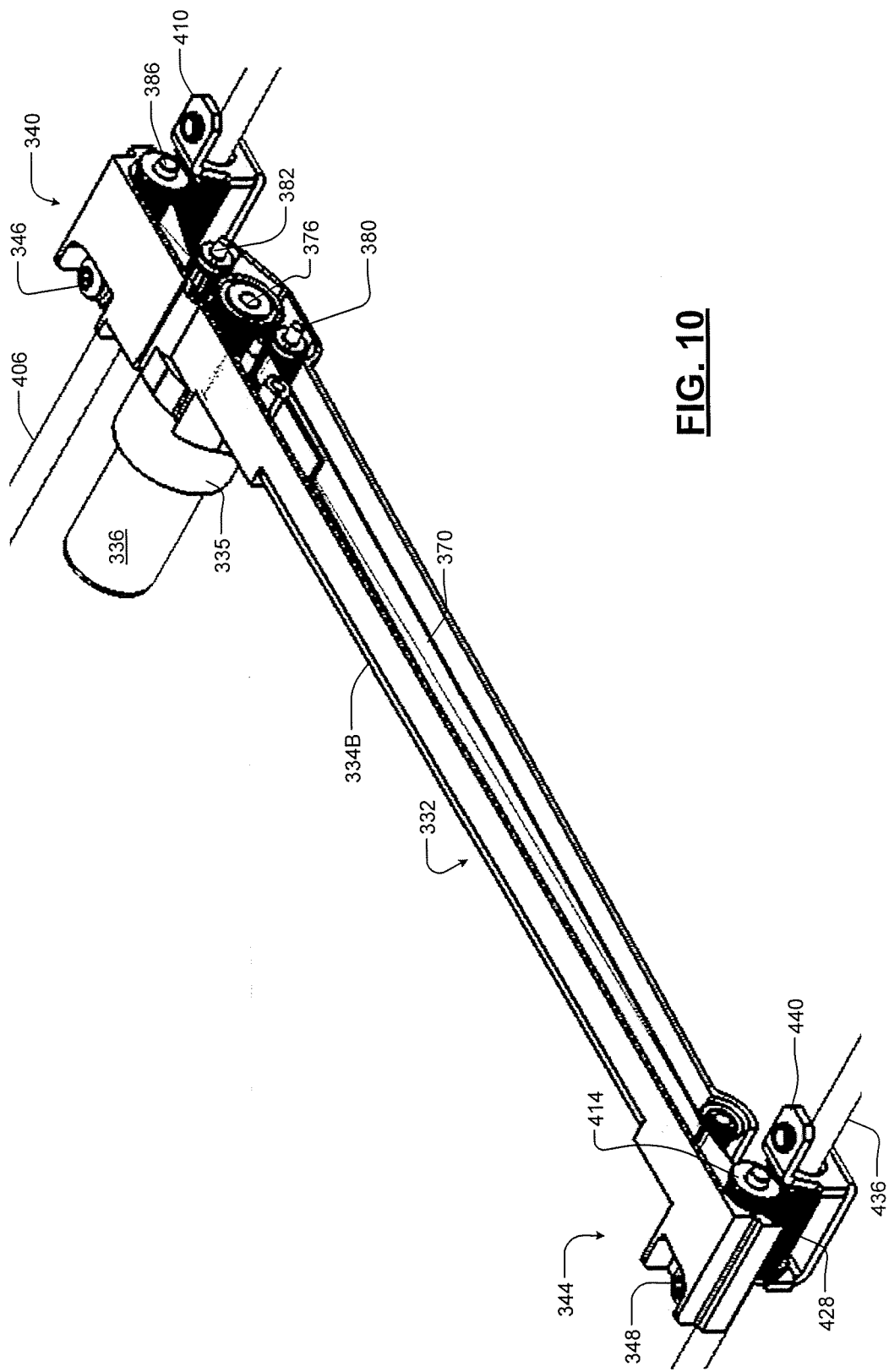
FIG. 10 is a perspective view of the seat track assembly of FIG. 9 with the housing partially removed.
Figure 11:
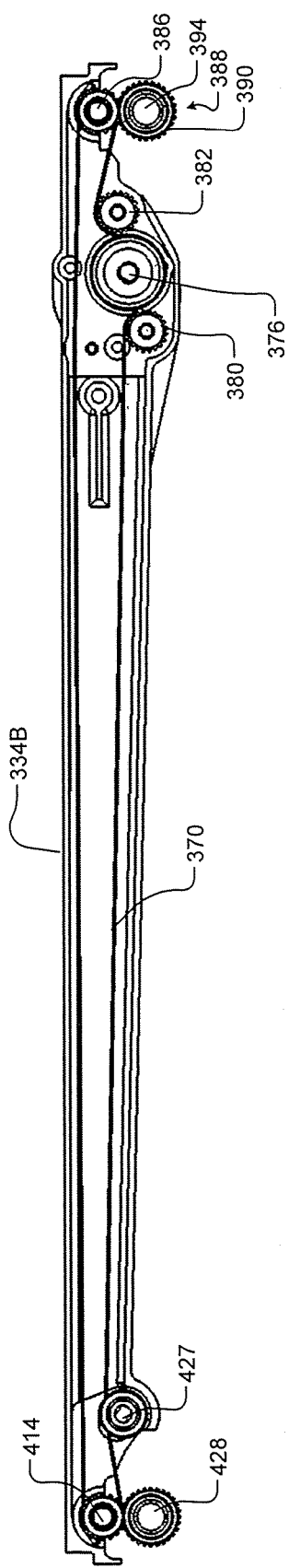
FIG. 11 is a side view of the seat track assembly of FIG. 9 with the housing partially removed.
Figure 12:
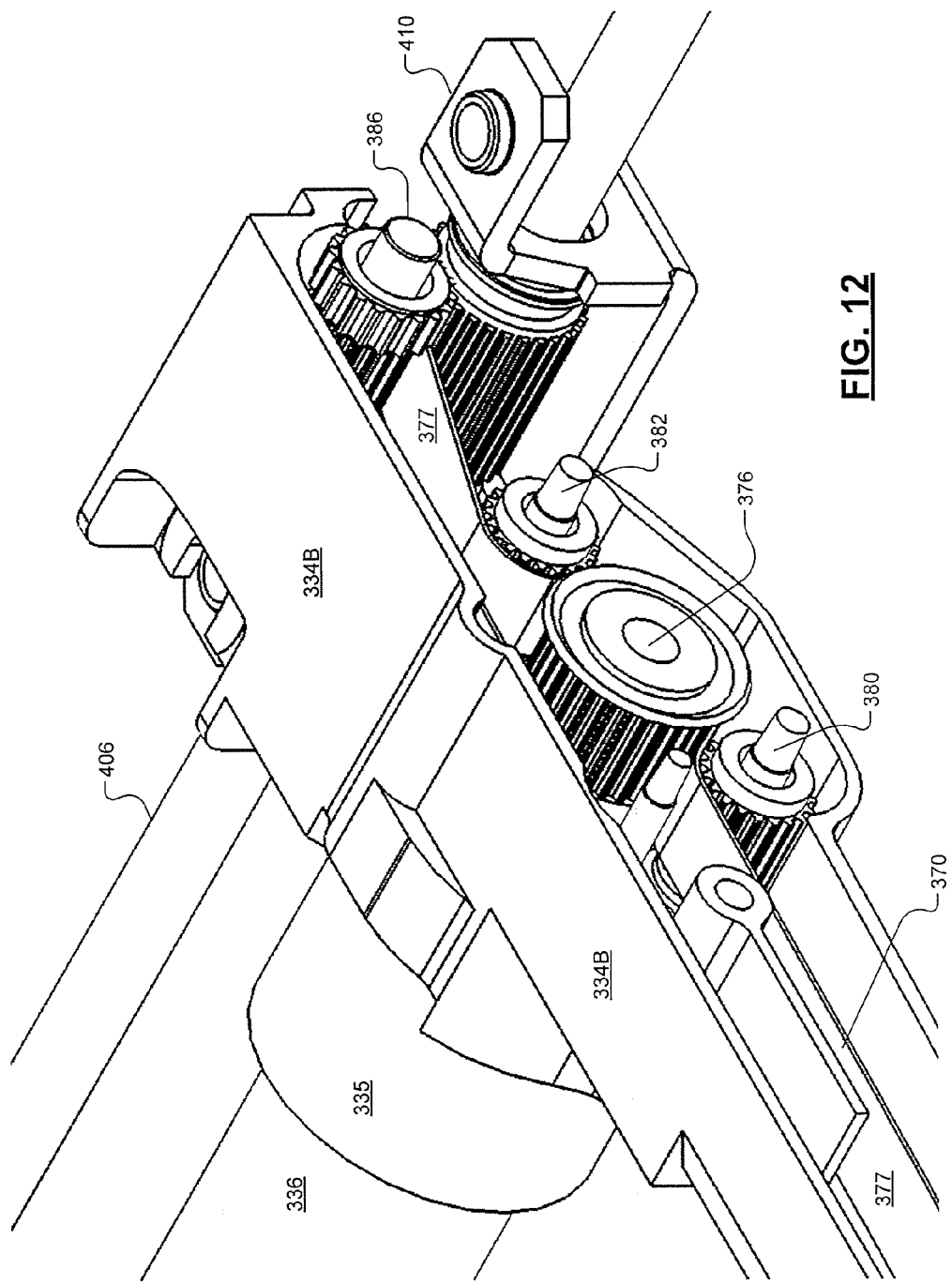
FIGS. 12 and 13 are perspective views of the seat track assembly of FIG. 9 with the housing partially removed.
Figure 13:
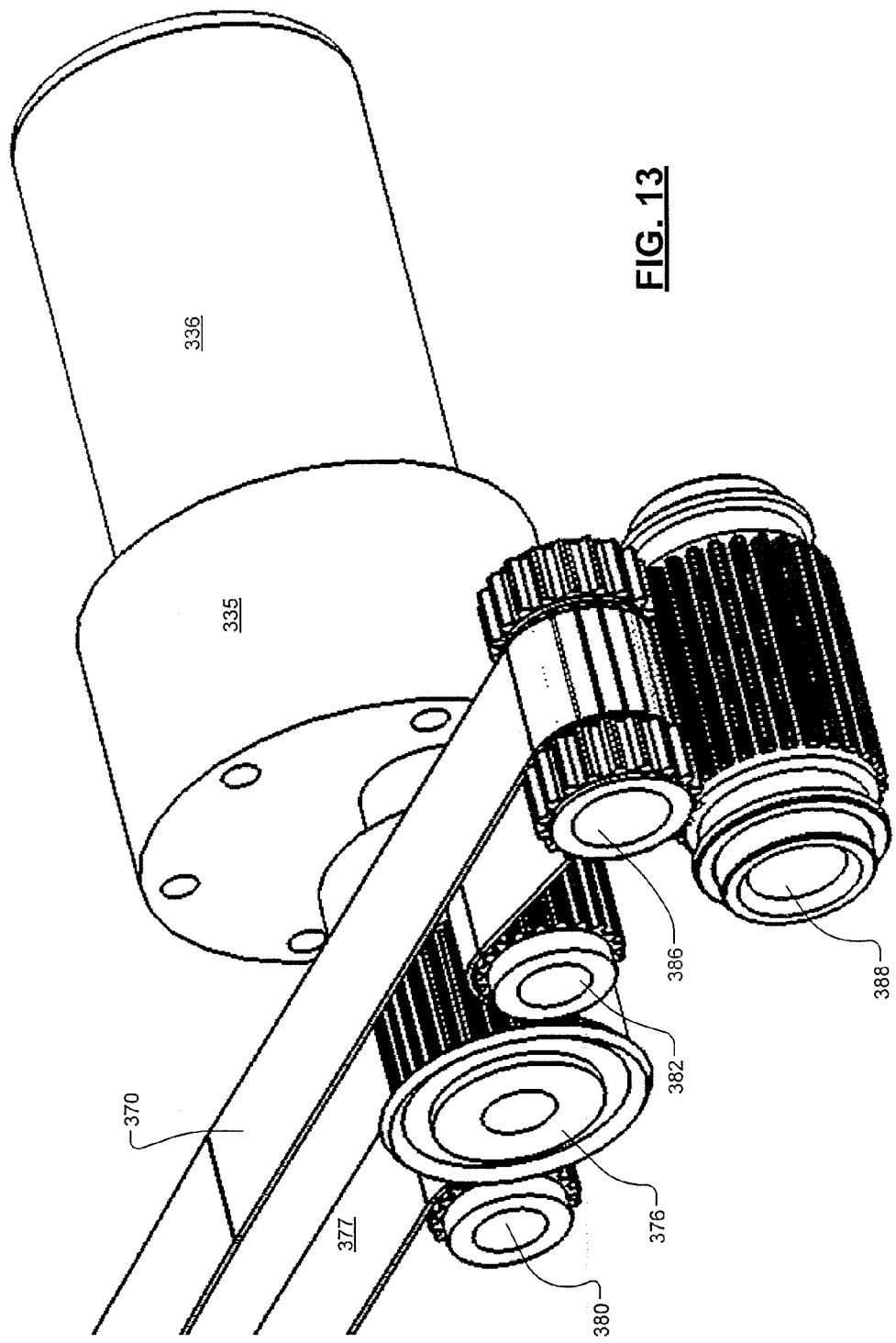

Referring now to FIGS. 9-14, another example of a vehicle seat track assembly 310 according to the present disclosure is shown. In FIG. 9, the vehicle seat track assembly 310 includes a first track portion 312 including a first lower track 317 and a first upper track 318 that are arranged adjacent to one side of a seat (not shown). The first upper track 318 is adapted to move relative to the first lower track 317.

A second track portion 322 includes a second lower track 327 and a second upper track 328 that are arranged adjacent to a second side of the seat. The second upper track 328 is adapted to move relative to the second lower track 327. The first and second lower tracks 317 and 327, respectively, are fixed for movement and are typically connected to a floor of a vehicle. The first track portion 312 is arranged generally parallel to the second track portion 322.

A third track portion 332 is connected between the first and second upper tracks 318 and 328. The third track portion 332 includes a housing 334 (including first and second housing portions 334A and 334B) and a motor 336. As will be described further below, the motor 336 rotates to cause the first and second upper tracks 318, 328 to move fore and aft relative to the first and second lower tracks 317 and 327. An output of the motor 336 may be coupled to a gearbox 335 having a gearbox ratio before being applied to the toothed belt. While gearbox is shown, any output speed reducing mechanism can be used to reduce an output speed of the motor output shaft.

The third track portion 332 includes a first end 340 that is attached to the first upper track 318. For example only, the first end 340 can be attached to the first upper track 318 using one or more fasteners 346 such as bolts. The third track portion 332 includes a second end 344 that is attached to the second upper track 328. For example only, the second end 344 can be attached to the second upper track 328 using one or more fasteners 348 such as bolts.

In FIGS. 10-13, the third track portion 332 and the motor 336 are shown with the housing portion 334A removed. The third track portion 332 includes a continuous toothed belt 370. The toothed belt 370 may have teeth on inner and outer surfaces thereof. Alternately, the toothed belt 370 may have teeth on the inner or outer surface thereof.

An output shaft of the motor 326 drives a first drive pulley 376, which engages an inner surface 377 (FIG. 11) of the toothed belt 370. First and second idler pulleys 380, 382 bias the inner surface 377 of one portion of the toothed belt 370 against the first drive pulley 376.

At the first end 340, the toothed belt 370 rotates around a drive pulley 386. A drive nut 388 includes a toothed outer portion 390 and a threaded bore 394 (FIG. 11) passing through the drive nut 388. The drive nut 388 is located adjacent to the drive pulley 386 and rotates around a first lead screw 406, which is threaded. The first lead screw 406 passes through one side of a bracket 410, a threaded bore of the drive nut 388 and another side of the bracket 410. In some examples, the bracket 410 has a "U"-shaped cross section, although other arrangements may be used. The bracket 410 may be used to attach the third track portion 332 to the first upper track 318 at the first end 340.

Opposite sides of the toothed belt 370 are in contact with the drive pulley 386 and the drive nut 388, respectively. When the drive nut 388 is rotated by the toothed belt 370, the threads of the threaded bore of the drive nut 388 rotate along the first lead screw 406. The drive nut 388 moves relative to the first lead screw 406, which causes the third track portion 332 and the first upper track 318 to move relative to the first lead screw 406.

At the second end 344, the toothed belt 370 rotates around a drive pulley 414. A drive nut 428 includes a toothed outer portion and a threaded bore passing through the drive nut 428. The drive nut 428 is located adjacent to the drive pulley 424 and rotates around a second lead screw 436, which is threaded. The second lead screw 436 passes through one side of a bracket 440, the threaded bore of the drive nut 428 and another side of the bracket 440. The bracket 440 may be used to attach the third track portion 332 to the second upper track 328 at the second end 344.

Opposite sides of the toothed belt 370 are in contact with the drive pulley 424 and the drive nut 428, respectively. When the drive nut 428 is rotated by the toothed belt 370, the threads of the threaded bore of the drive nut 428 rotate along the second lead screw 436. The drive nut 428 moves relative to the second lead screw 436, which causes the third track portion 332 and the second upper track 328 to move relative to the second lead screw 436.

Figure 14:
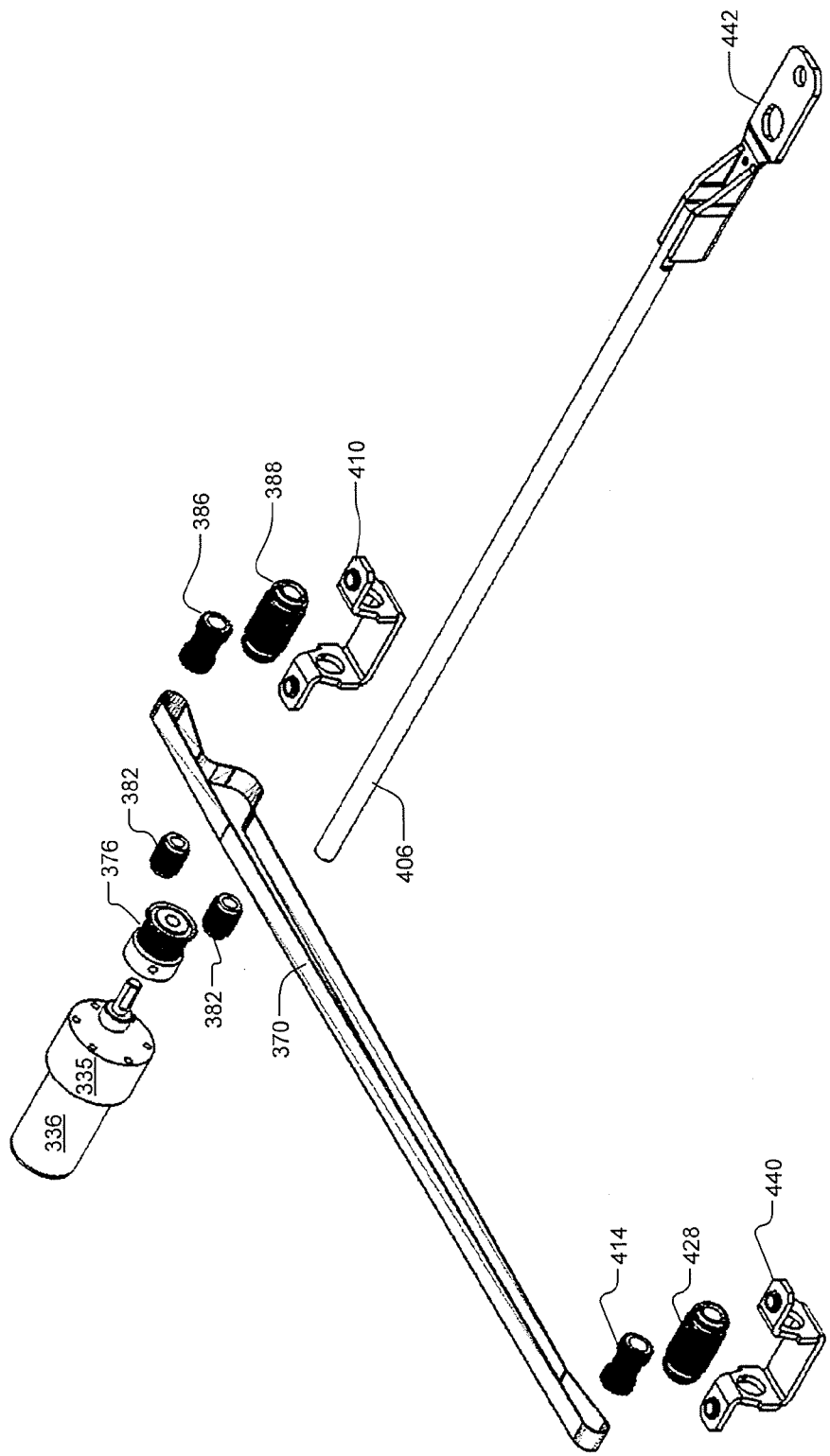
FIG. 14 is an exploded perspective view of the vehicle seat track assembly of FIG. 9.

In FIG. 14, the first and second lead screws 406 and 436 may include brackets 442 located at ends thereof. The brackets 442 may be used to fix a position of the first and second lead screws 406 and 436 relative to the frame of the vehicle. The brackets 442 also provide clearance to allow the drive nuts 388 and 428 to move relative to the first and second lead screws 406 and 436 without touching the first and second lower tracks 317, 327.

In some examples, the gearbox reduces the speed of the motor 336 before being output to the toothed belt by a ratio of 1:2 to 1:10. In other examples, the speed of the motor 336 is reduced before being output to the toothed belt by a ratio of 1:4 to 1:8. In other examples, the speed of the motor 336 is reduced before being output to the toothed belt by a ratio of approximately 1:6. In some examples, the output shaft of the motor rotates at a speed of 4000-8000 rpm. In other examples, the output shaft of the motor rotates at a speed of approximately 6000 rpm.

As can be appreciated, the speed of the toothed belt is significantly reduced as compared to the speed of the dual cable drives in prior systems. For example only, the speed of the toothed belt may be in a range from 40 to 120 rpm. In other examples, the speed of the toothed belt may be in a range from 50 to 80 rpm.

In some examples, the first and second lead screws have a pitch that is less than 3 mm per revolution. In other examples, the first and second lead screws have a pitch that is between 1-2.5 mm per revolution. In other examples, the first and second lead screws have a pitch of 1.5 mm per revolution. The reduced pitch significantly reduces or eliminates backdrive potential. Backdrive refers to the ability to move the seat by applying force in the fore or aft direction without using the motor.

Using the toothed belt to drive the vehicle seat adjuster eliminates conventional drive cables and the worm/worm gearboxes associated with each of the tracks.

Some examples of the vehicle seat track assembly of the present disclosure provide functional simplicity by removing a gear reduction system from a track resonance path, eliminating multiple/redundant gear reduction mechanisms, lowering the "long distance" translation rotational speed, and/or eliminating high cost cable systems that require the additional cost of sound abatement measures.

Some examples of the vehicle seat track assembly improve efficiency by providing of a single gear reduction at the motor output using a single worm interface with the belt teeth or the gearbox, reducing translation friction by the use of a toothed belt as opposed to conventional captured cable/tube assembly drive, and/or minimizing noise abatement components resulting in lower system friction.

Another goal of the present disclosure is to provide a vehicle seat track assembly having a toothed single belt driven actuator that provides a flexible, strong structure by allowing for increased track system variation with parallelism in all planes, sufficient crash-worthiness using a similar lead screw/drive nut in prior systems and relatively easy adaptation to current production vehicle seat systems.

The present disclosure improves design flexibility by removing the gear reduction devices from a restrictive space in the parallel tracks portions. The present disclosure allows the use of both conventional and custom belt tooth profiles. The motors can have rotating output shafts or rotating outside casings. Different belt configurations may be used such as single-sided teeth, double-sided teeth, ball links, continuous link chains, etc. Different belt materials may also be used such as plastic, steel, rubber, urethane, etc. The orientation of the electric motor can be rotated by replacing the worm gear interface with a gearbox or other system.

EXAMPLE 1

In one example of the seat track assembly, the motor 336 operates at 6000 rpm and has an input voltage of 12 VDC. The gearbox 335 provides a speed reduction of 1:6 to provide an output speed of 1000 rpm without a load and 750 rpm with a load. The motor 336 provides a rated torque of approximately 10 milli-Newton-meters (m-Nm) at an output shaft of the motor. The torque at the output of the gearbox 335 is approximately 50 m-Nm.

The first drive pulley 376 may have an output diameter of 18.59 mm and a pitch diameter of 19.10 mm. The first drive pulley 376 may have 30 teeth and a S2M curvilinear belt profile. The idler pulleys 380 and 382 may have 20 teeth, a S2M curvilinear belt profile, an outer diameter of 12.22 mm and a pitch diameter of 12.73 mm. The drive pulley 386 may have 18 teeth, a S2M curvilinear belt profile, an outer diameter of 10.95 mm and a pitch diameter of 11.46 mm. The drive pulley 414 may have 16 teeth, a S2M curvilinear belt profile, an outer diameter of 9.68 mm and a pitch diameter of 10.19 mm. The drive nuts 388 and 428 have 28 teeth, a S2M curvilinear belt profile, an outer diameter of 17.32 mm and a pitch diameter of 17.83 mm. The threaded bores of the drive nuts 388 and 428 have single lead trapezoidal threads, a pitch of 1.5 mm per revolution and an outer diameter of 8 mm. Likewise, the lead screws have 406 and 436 have single lead trapezoidal threads, a pitch of 1.5 mm per revolution and an outer diameter of 8 mm.

The toothed belt 370 includes 433 teeth, a S2M curvilinear belt profile and a tooth pitch of 2 mm. The toothed belt 370 may be made of Kevlar cord reinforced urethane. While specific dimensions and materials have been disclosed in conjunction with this example, other materials and dimensions may be used.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle seat track assembly comprising:
    a first track portion including a first track, a second track, a bracket connected to the first track and including first and second portions, a toothed drive nut including a threaded bore, and a lead screw passing through the first portion of the bracket, the toothed drive nut and the second portion of the bracket;
    a second track portion arranged parallel to the first track portion and including a first track, a second track, a bracket connected to the first track and including first and second portions, a toothed drive nut including a threaded bore, and a lead screw passing through the first portion of the bracket, the toothed drive nut and the second portion of the bracket; and
    a third track portion comprising a motor having an output shaft, an output speed reducing mechanism coupled to the output shaft, a toothed drive pulley coupled to the output speed reducing mechanism, and a continuous toothed belt that is rotated by the toothed drive pulley and that causes rotation of the toothed drive nut of the first track portion and the toothed drive nut of the second track portion.

2. The vehicle seat track assembly of claim 1, wherein the output speed reducing mechanism comprises one of a gearbox and a worm gear.

3. The vehicle seat track assembly of claim 1, wherein the third track portion further comprises:
    a housing; and
    a first toothed pulley and a second toothed pulley rotatably attached to the housing at a first end and a second end of the housing,
    wherein the continuous toothed belt rotates around the first toothed pulley and the second toothed pulley, and
    wherein the first toothed pulley causes rotation of the toothed drive nut of the first track portion and the second toothed pulley causes rotation of the toothed drive nut of the second track portion.

4. The vehicle seat track assembly of claim 3, wherein the continuous toothed belt is in contact with and sandwiched between the first toothed pulley and the toothed drive nut at the first end and wherein the continuous toothed belt is in contact with and sandwiched between the second toothed pulley and the toothed drive nut at the second end.

5. The vehicle seat track assembly of claim 1, wherein the output speed reducing mechanism reduces an output speed of the output shaft by a ratio of 1:2 and 1:10.

6. The vehicle seat track assembly of claim 1, wherein the output speed reducing mechanism reduces an output speed of the output shaft by a ratio of 1:4 to 1:8.

7. The vehicle seat track assembly of claim 1, wherein the output speed reducing mechanism reduces an output speed of the output shaft by a ratio of approximately 1:6.

8. The vehicle seat track assembly of claim 1, wherein the bracket is "U"-shaped.

9. The vehicle seat track assembly of claim 1, wherein the third track portion further comprises first and second idler pulleys that bias the continuous toothed belt against the drive pulley.

10. The vehicle seat track assembly of claim 1, wherein the lead screw of the first track portion and the lead screw of the second track portion have a pitch that is less than 3 mm per revolution of the toothed drive nut of the first track portion and the toothed drive nut of the second track portion, respectively.

11. The vehicle seat track assembly of claim 1, wherein the lead screw of the first track portion and the lead screw of the second track portion have a pitch that is between 1 and 2.5 mm per revolution of the toothed drive nut of the first track portion and the toothed drive nut of the second track portion, respectively.

12. A drive mechanism for a vehicle seat track assembly, comprising:
    a housing;
    a motor having an output shaft;
    an output speed reducing mechanism coupled to the output shaft, wherein the motor and the output speed reducing mechanism are mounted to the housing;
    a toothed drive pulley rotatably mounted to the housing and coupled to the output speed reducing mechanism;
    a first toothed pulley rotatably mounted at a first end of the housing;
    a second toothed pulley rotatably mounted at a second end of the housing; and
    a continuous toothed belt that is rotated by the toothed drive pulley and that causes rotation of the first and second toothed pulleys.

13. The drive mechanism of claim 12, further comprising:
    a first track portion including
        a first track;
        a second track;
        a bracket connected to the first track and including first and second portions;
        a toothed drive nut including a threaded bore, wherein the toothed drive nut of the first track portion is rotated by the first toothed pulley; and
        a lead screw passing through the first portion of the bracket, the toothed drive nut and the second portion of the bracket.

14. The drive mechanism of claim 13, further comprising:
    a second track portion arranged parallel to the first track portion and including
        a first track;
        a second track;
        a bracket connected to the first track and including first and second portions;
        a toothed drive nut including a threaded bore, wherein the toothed drive nut of the second track portion is rotated by the second toothed pulley; and
        a lead screw passing through the first portion of the bracket, the toothed drive nut and the second portion of the bracket.

15. The drive mechanism of claim 14, wherein the continuous toothed belt is in contact with and sandwiched between the first toothed pulley and the toothed drive nut at the first end and wherein the continuous toothed belt is in contact with and sandwiched between the second toothed pulley and the toothed drive nut at the second end.

16. The drive mechanism of claim 14, wherein the bracket is "U"-shaped.

17. The drive mechanism of claim 14, wherein the lead screw of the first track portion and the lead screw of the second track portion have a pitch that is less than 3 mm per revolution of the toothed drive nut of the first track portion and the toothed drive nut of the second track portion, respectively.

18. The drive mechanism of claim 14, wherein the lead screw of the first track portion and the lead screw of the second track portion have a pitch that is between 1 and 2.5 mm per revolution of the toothed drive nut of the first track portion and the toothed drive nut of the second track portion, respectively.

19. The drive mechanism of claim 12, wherein the output speed reducing mechanism comprises one of a gearbox and a worm gear.

20. The drive mechanism of claim 12, wherein the output speed reducing mechanism reduces an output speed of the output shaft by a ratio of 1:2 and 1:10.

21. The drive mechanism of claim 12, wherein the output speed reducing mechanism reduces an output speed of the output shaft by a ratio of 1:4 to 1:8.

22. The drive mechanism of claim 12, wherein the output speed reducing mechanism reduces an output speed of the output shaft by a ratio of approximately 1:6.

23. The drive mechanism of claim 12, further comprising first and second idler pulleys that are rotatably connected to the housing and that bias the continuous toothed belt against the drive pulley.

* * * * *